United States Patent [19]
Nakasato et al.

[11] Patent Number: 5,578,110
[45] Date of Patent: Nov. 26, 1996

[54] ENVIRONMENTALLY ACCEPTABLE METHOD OF DISPOSING OF AN INFLATOR FROM AN AIR BAG SYSTEM LOADED IN A SCRAPPED AUTOMOBILE

[75] Inventors: Yuzaburo Nakasato, Gunma; Mitsuhiko Fukabori, Hyogo; Takaaki Iwasaki, Hokkaido; Humio Ayuta, Chiba; Sumio Otsuka; Yoshitaka Miyawaki, both of Kagawa, all of Japan

[73] Assignees: Daicel Chemical Industries, Ltd.; Nomura Kohsan Co., Ltd., both of Japan

[21] Appl. No.: 417,600

[22] Filed: Apr. 6, 1995

[30] Foreign Application Priority Data

Apr. 11, 1994 [JP] Japan .................. 6-071912

[51] Int. Cl.$^6$ .................................................. C22B 7/00
[52] U.S. Cl. .................. 75/403; 75/425; 75/430; 75/581; 75/687
[58] Field of Search ............... 75/403, 687, 581, 75/425, 430

[56] References Cited

U.S. PATENT DOCUMENTS 5,073,273  12/1991  Gupta et al. ...................... 210/766
5,294,244   3/1994  Allerton et al. ...................... 75/687

Primary Examiner—Melvyn Andrews
Attorney, Agent, or Firm—Weingram & Assocs.

[57] ABSTRACT

A method by which numerous gas generators from unused air-bags can be scrapped in an environmentally acceptable manner. The method consists of a) heating the gas generator to actuate the generator to produce combustion gases and an actuated generator having water soluble contaminants thereon;

b) washing the actuated generator with a water composition to remove the contaminants from the actuated generator to produce a washed generator and a contaminated water composition containing the contaminants;

c) dividing the washed generator to produce divided generator parts;

d) chemically treating the contaminated water composition to produce a purified water composition; and e) classifying the divided generator parts into classified generator parts.

Optionally, the dividing step can occur before the washing step, or before and after the washing step. The classified generator parts and purified water can be disposed of in an environmentally acceptable manner.

14 Claims, 1 Drawing Sheet

ENVIRONMENTALLY ACCEPTABLE METHOD OF DISPOSING OF AN INFLATOR FROM AN AIR BAG SYSTEM LOADED IN A SCRAPPED AUTOMOBILE

BACKGROUND OF THE INVENTION

1. Field of the Invention

The present invention relates to a method of disposing of gas generators from unused air-bags which are scrapped with automobiles in an environmentally acceptable manner.

2. Description of the Prior Art

Air bag units for automobiles are widely used throughout the world. They are installed to protect passengers during a crash. Generally, an air bag unit comprises an air bag and a gas generator unit. Upon impact the gas generator unit is actuated and instantaneously releases gas to rapidly expand the air bag. The inflated air bag forms a cushion between the passenger and, for example, the steering wheel to prevent the passenger from impacting against the steering wheel as he or she is flung forward when the automobile rapidly decelerates.

The gas generator has a metallic housing. A gas generating agent is disposed in the housing along with an ignition means for igniting the agent. The ignition means is designed to be actuated by mechanical shock. Actuation of the gas generating agent causes rapid combustion which generates gas to instantaneously inflate the air bag.

Typically the housing for a gas generator is made of, for air bag.

Typically the housing for a gas generator is made of, for example, aluminum alloy and stainless steel. The gas generant typically has as primary components, for example $NaN_3$ (sodium azide) and $CuO$ (copper monoxide). In addition, the gas generator can include a filter, a coolant, a sealant and a cushion, all of which contain organic compounds having carbon (C) and nitrogen (N).

During the combustion process of the gas generant, many reactions can occur between the foregoing components. For example:

$$2NaN_3 + CuO \rightarrow Na_2O + Cu + 3N_2$$

When the gas generator is activated the nitrogen gas generated explodes into the air bag leaving behind in the gas generator $Na_2O$ (sodium oxide) contaminant. The $Na_2O$ can subsequently react with moisture and carbon dioxide in air to form an alkali, e.g. sodium hydroxide and sodium carbonate:

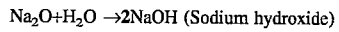
$Na_2O + H_2O \rightarrow 2NaOH$ (Sodium hydroxide)

and

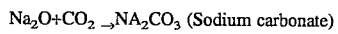
$Na_2O + CO_2 \rightarrow Na_2CO_3$ (Sodium carbonate)

The sodium hydroxide and sodium carbonate contaminants are alkaline compounds and if not controlled can pollute the environment.

Additionally, upon actuation of the gas generator the carbon-nitrogen containing organic compounds used in the generator thermally decompose to form cyano compounds (—CN). These cyano contaminants are toxic as well as also being environmental pollutants.

When automobiles are scrapped, they are usually compressed. If an automobile is compressed with an unused air bag unit therein, there is the risk that the air bag unit will explode. In order to avoid this risk, the scrapping process is carried out only after actuation of the gas generator. Typically, automobile manufacturers have the following disposal instructions:

1. For electric system gas generators—a prescribed current is applied to the unactuated gas generator by wires leading from a battery. This actuates the gas generator. This may be accomplished either with the device in the car or may be accomplished by removing, for example, the steering wheel from the car.

2. For mechanical system gas generators—The gas generator is removed from the car, placed within scrapped or used tires and then mechanically actuated.

Potential problems exist even when the car is compressed after actuation of the gas generator. As indicated previously, the actuation of the gas generator causes $Na_2$ and —CN contaminants to remain in the gas generator. Therefore, when the automobile is compressed there is a risk that this will cause the $Na_2O$ and —CN compounds to scatter. This can lead to a violent reaction with water and/or the polluting the environment with toxic and environmentally undesirable —CN compounds.

If, on the other hand, the gas generators are removed from the automobiles and scrapped separately from the automobiles, the toxic and environmental contaminants, i.e. $Na_2O$ and —CN compounds can be similarly scattered when, for example, the gas generator is cut into smaller pieces. Such scattering of the contaminants can cause safety, health and environmental problems.

OBJECTS AND SUMMARY OF THE INVENTION

The object of the present invention is to overcome the aforementioned problems in scrapping automobiles and air bags and to provide a method of disposal for the gas generators in such air bags, which is efficient, safe and environmentally acceptable, i.e does not pollute the environment and, optionally, permits recycling of the recovered materials.

A method is provided by which numerous gas generators from unused air-bags can be scrapped in an efficient, safe and environmentally acceptable manner. The method comprises:

a) heating the gas generator, preferably between about 150° C. and 450° C., to actuate the generator to produce combustion gases and an actuated generator having water soluble contaminants, typically alkaline and/or heavy metal ions, thereon;

b) washing the actuated generator with a water composition to remove the contaminants from the actuated generator to produce a washed generator and a contaminated water composition;

c) dividing the washed generator to produce divided generator parts;

d) chemically treating the contaminated water composition to produce a purified water composition, preferably by neutralizing the contaminated water with an acid to a pH between about 6 and 8; and e) classifying the divided generator parts into classified generator parts by, for example, magnetic classification, gravitational classification, manual classification or combinations thereof.

Optionally, the dividing step can occur before the washing step, or before and after the washing step. The classified generator parts and purified water can be disposed of in an environmentally acceptable manner, e.g. melting the classified generator parts into ingots.

BRIEF DESCRIPTION OF THE DRAWINGS

Other objects and features of the invention will be apparent from the following Detailed Description of the Invention taken in conjunction with the accompanying drawings, in which.

DETAILED DESCRIPTION OF THE INVENTION

Figure 1:
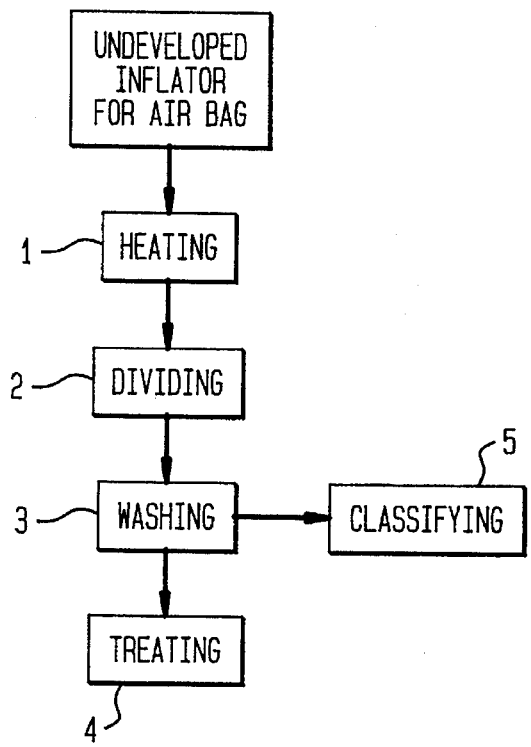
FIG. 1 is a flow chart of one embodiment of the method of the present invention.
Figure 2:
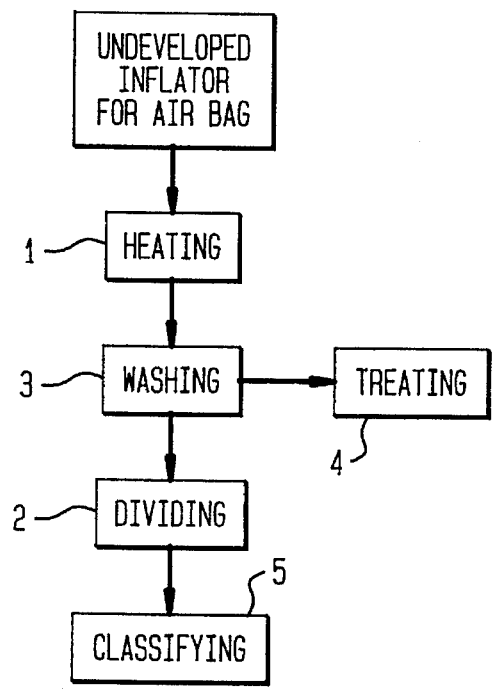
FIG. 2 is a flow chart of another embodiment of the method of the present invention.

Referring to FIGS. 1 and 2, heating the gas generator, step 1, is effective for actuating the unactuated gas generator efficiently and safely. For example, heating the unactuated gas generator to about 150° C. to 450° C. ignites the ingredients of the gas generator to cause complete combustion. This permits the actuated gas generator to be safely sent to the next process step.

The heating may be accomplished in a heating furnace which is operated in either a batch or continuous mode. If the furnace is operated in a batch mode to actuate generators, many unactuated gas generators may be actuated simultaneously. While this may be an advantage, such a batch mode of actuation generates, at one time, massive quantities of gas. Generation of such quantities of gas requires taking certain safety precautions. If, as is preferred, the heating furnace is used in a continuous mode, gas generators are continuously and individually fed to the furnace and are activated one at a time in the sequence in which they are fed to the furnace. Such a continuous system is preferred because it will not cause the massive generation of gases associated with the batch mode of actuation, and is thus a safer procedure. Further, such a continuous mode of operation allows greater control over the furnace operation, i.e. temperature, pressure, residence times.

The instantaneous generation of gas upon actuation of gas generators can cause the gas generator to fly about in the furnace. Accordingly, it is preferred that the gas generator be fixed in some manner in the furnace. This has been done, for example, by enclosing the generator in a gauze and supporting the gauze enclosure, which holds the generator, on a rod.

Provisions must also be made in the furnace to accommodate such rapid generation of gases and fluctuating pressures, e.g. baffles, as well as to provide for cleaning the gas generated to make it environmentally suitable for release to the atmosphere.

Referring to FIG. 1, it is often desirable to perform the dividing step 2 on the actuated gas generators prior to the washing step 3 in order to permit the water to readily penetrate and wash all of the divided parts. This is preferred over the process of FIG. 2, wherein the washing step 3 is performed immediately after the heating step 2.

The dividing step 2, whether performed before or after the washing step 3, can be accomplished with, for example, a cutter. Further, if it is desired to recycle the materials thereof, a shredder can be used to further divide the gas generators so that the gas generator parts can be classified. In this case, it is also desirable, immediately after actuation of the gas generators, to classify the generators, for example, as those comprised primarily of aluminum alloys and those comprised primarily of stainless steel. This classification can be accomplished manually or by employing an automatic weight classifier and/or a form classifier.

In the case where the gas generator is subjected to the washing treatment 3 after dividing 2, the washing method may comprise dipping the divided gas generator parts in a water bath which is stirred. Optionally, the divided gas generator parts may be placed in an activated tumbler which in a water bath or on a moving conveyor and sprayed with water.

As the washing process continues, the water soluble contaminants, e.g. alkaline and heavy metal contaminants are dissolved in the water, increasing the alkalinity of the water. Washing the gas generators with such alkaline water can have an adverse effect on the process. For example, the effectiveness of the rinsing step decreases and the alkaline water can cause the aluminum in the gas generators to dissolve and react with the alkaline compounds in the water to generate gases. This thus requires that the wash water be circulated to prevent the accumulation of alkaline compounds in the water as well as neutralizing the wash waters with inorganic acids and filtering the wash water. Preferably both of these steps are performed in the course of circulating the wash water. After the wash water has been circulated for an extended period of time, the contaminated wash water can be replaced with fresh wash water. The contaminated wash water can be subsequently treated until it can be disposed of in an environmentally acceptable manner, i.e. until it meets waste water quality standards.

After the contaminants are washed from the gas generator, it may still be desirable to perform a final rinse to remove any contaminants still remaining on the gas generator. This is carried out with fresh water. After this rinsing step this water can then be used for washing. Such a process results in the overall saving of water.

In the chemically treating step, i.e. 4 in FIGS. 1 and 2, the contaminated water, which contains alkalis from the washing of the gas generators, is subjected to a neutralizing treatment with, for example, inorganic acids of 0.5 Normal concentration or higher, so that the water meets waste water quality standards ($5.8 \leq pH \leq 8.6$). The contaminated water may also be treated with ion exchange resins and chelating resins to remove the trace amounts of heavy metal contaminants in the water, e.g. copper, chromium, iron and lead.

Referring to FIGS. 1 and 2, dividing the gas generators 2 can be accomplished with cutters and crushers of various forms. In the case where the materials for the gas generator are recovered for recycling, the gas generator is preferably divided as finely as possible in order to increase the yield of recovery. For example, a cutter using helical teeth can be employed, such as Good Cutter produced by Ujiie Mfg. Co., Ltd. This is a biaxial system wherein a helical tooth is mounted on each axis and rotated in opposite directions to each other. This device, when overloaded by for example the lodging of a piece of metal between the teeth, automatically stops and rotates in the opposite direction to dislodge the cut piece causing the overload. After dislodgment, the operation is automatically continued. The helical teeth can be decreased or increased in size as needed.

Referring to FIGS. 1 and 2, classification of the divided parts 5, particularly metal parts, can be accomplished by, for example, magnetic separation, eddy current system separation, gravity separation, manual separation, or combinations thereof. The eddy current system separation is a method wherein an eddy current is generated in the inside of conductors generating a magnetic field which is then used to separate different types and sizes of the divided metal.

FIG. 1 is a flow chart for one embodiment of the method of the present invention. This method comprises:

a) heating the gas generator to actuate the generator to produce combustion gases and an actuated generator having water soluble contaminants thereon;

b) dividing the actuated generator to produce divided generator parts;

c) washing the divided generator parts with a water composition to remove the contaminants from the divided generator parts to produce washed generator parts and a contaminated water composition containing the contaminants;

d) chemically treating the contaminated water composition to produce a purified water composition; and e) classifying the washed generator parts into classified generator parts.

FIG. 2 is a flow chart of another embodiment of the method of the present invention. In this method, contrary to that shown in FIG. 1, the gas generator is washed after actuating and then divided.

The dividing step 2, when carried out prior to the washing step 3, facilitates the penetration of washing water into the generator parts, whereas when the washing step 3 is carried out prior to the dividing step 2, it prevents combustion residue contaminants from being uncontrollably scattered and dispersed during the subsequent dividing step. The order of priority therefor can suitably be selected according to the desired results.

The aforedescribed invention permits gas generators to be disposed of in an environmentally acceptable manner, i.e. one that does not pollute the environment and is safe and efficient and produces scrap from such generators which can be recycled for use.

The following are non-limiting examples of the method of this invention.

EXAMPLE 1

Ten actuated gas generators, i.e. five mechanical system gas generators and five electric system gas generators, were fixed to a gauze at the upper and lower part of the generator. The generators were connected to the gauze at intervals of 150 mm. The gas generators were then inserted into an electric furnace maintained at 250° C. The gas generators were moved through the furnace at a speed of about 150 mm/min. Actuation of the first gas generator took place about five minutes after initial insertion of the generators into the furnace and subsequent actuations were repeated at intervals of about one minute. About 20 minutes later, the last gas generator was discharged from the electric furnace. After removal from the furnace, all the gas generators were cooled in air for about one hour. All the gas generators had been actuated.

After actuation of the generators, they were manually classified and separated into mechanical system gas generators and electric system gas generators. In the mechanical system gas generators, the housing members such as the diffuser shell and the closure shell, are composed of an aluminum alloy, and the locking screws, filter and the coolant are composed of stainless steel. In the electric system gas generators, aluminum is rarely used, and stainless steel is the primary metallic material.

The gas generators, i.e. both the mechanical and electric system generators, were then fed, one at a time, into a helical teeth cutter (Model UGSS40 manufactured by Ujiie Mfg. Co., Ltd.) at intervals of 10 seconds to crush/cut/divide each gas generator.

EXAMPLE 2

Treatment of Mechanical System Gas Generators

A mechanical system gas generator processed according to Example 1, was placed in a cylindrical gauze bag (300 mm diameter×500 mm long), and dipped into a washing vessel (400 mm diameter×700 mm long). The gauze bag was rotated at 10 rpm, and washing water was circulated with a pump at 5 l/min.

A fifty liter (50 l) tank, equipped with a stirrer, for holding a neutralizing bath was connected to a pipe line for circulating wash water to the washing vessel. The tank included a pH-adjusting apparatus having glass electrodes and a pump for feeding sulfuric acid into the bath. The apparatus was used to control the pH of the circulating wash water between 6.5 and 7.5. The sulfuric acid concentration used for neutralization was 2 Normal. After about two hours of circulating wash water through the washing vessel, the pH of the wash water stabilized indicating that the washing was completed. The gauze bag was then pulled from the washing vessel. The amount of 2 Normal sulfuric acid consumed was 1.1 liters. The gauze bag containing the generator was then rinsed in a rinsing vessel with fresh water for about 5 minutes, squeezed to remove excess water and dried at 150° C. for 2 hours.

EXAMPLE 3

Process 1

The mechanical system gas generator treated pursuant to Example 2 (3.3 kg) was fed into the aforedescribed helical teeth cutter (Model UGSS40 manufactured by Ujiie Mfg. Co., Ltd.) at about 50 grams per second to crush the sample. After this primary crushing, the sample was separated into magnetic substances and non-magnetic substances with a magnetic separator (Model DTP4630 manufactured by Nippon Magnetic Separation Co., Ltd.). The magnetic material separated (2.35 kg) was then fed into a cutter (Model UGS25) equipped with smaller sized helical teeth for further crushing. After this secondary crushing, the sample was again separated into magnetic and non-magnetic material as previously described. The results thereof are shown in the following Table 1.

TABLE 1

| Crushing process | Classification by magnetic separation (Kg) | |
| --- | --- | --- |
|  | Primary | Secondary |
| Magnetic | 2.35 | 1.45 |
| Non-magnetic | 0.90 | 0.85 |

Process 2

The non-magnetic samples obtained from the aforedescribed Process 1, were then classified with an eddy current type separator (Model SED4ZDS manufactured by Fuji Co., Ltd.). The final classification recovery results obtained in the total process, including manual separation, are shown in the following Table 2:

TABLE 2

| | Recovery results | | |
|---|---|---|---|
| Product | Weight (Kg) | Grade (%) | Recovery rate (%) |
| Aluminum | 1.70 | 98 | 81 |
| Stainless | 0.95 | 95 | 86 |
| Non-separated products | 0.70 | | |

EXAMPLE 4

A sample of the electric system gas generator treated pursuant to Example 1, was washed in the same manner as that in Example 2, except the washing water used in Example 2 was recycled for use in this Example 4. The sample was subjected to washing, which was completed in about 2 hours when the gauze bag was pulled from the washing vessel. About 2.2 liters of 2 Normal sulfuric acid was used. The generator was then placed in the rinsing vessel and rinsed for about five minutes with fresh water. The bag was then removed from the vessel, squeezed to remove excess water and then dried at 150° C. for 2 hours.

EXAMPLE 5

Twenty-five milliliters (25 ml) of 1 Normal sulfuric acid was fed into the 50 liters of washing water used in Example 4 to adjust the pH to 7. The wash water was then filtered with a No. 5A filter paper (diameter: 30 cm). The filtrate was then passed through an adsorption column filled with a chelating agent (Type UR-30 manufactured by Unitica Co., Ltd. ) for adsorbing heavy metals at a space velocity (SV) of 10. The washing water obtained after passing through the adsorption column met all waste water quality standards. The results are shown below in Table 3.

TABLE 3

| WASHING WATER TREATMENT RESULTS | | | | | |
|---|---|---|---|---|---|
| Treatment | pH | Cu | Ni | Cr | Fe |
| Non-treatment | 7.5 | 40.0 | 0.1 | 0.1 | <0.05 |
| After neutralizing treatment | 7.0 | 6.5 | 0.1 | <0.05 | <0.05 |
| After adsorption treatment | 7.0 | <0.05 | <0.05 | <0.05 | <0.05 |

WASTE WATER QUALITY STANDARDS

Cyano compounds: 1 mg/l

Chromium content: 2 mg/l

When an average drainage amount is 50 m$^3$ or more per day, pH: 5.8 to 8.6

Copper content: 5 mg/l

EXAMPLE 6

A 3.4 kg sample of the mechanical system gas generator treated pursuant to Example 4, was fed into the aforedescribed helical teeth cutter (Model UGSS40 manufactured by Ujiie Mfg. Co., Ltd.) at about 50 grams per second. After primary crushing, separation into magnetic substances and non-magnetic substances was carried out with a magnetic separator (Model DTP4630 manufactured by Nippon Magnetic Separation Co., Ltd.). The thus separated magnetic material (2.35 kg) was then fed into the cutter (Model UGS25) equipped with small size helical teeth. After this secondary crushing, the separation of the magnetic material from non-magnetic material was carried out again with the aforedescribed magnetic separator. The results are shown in the following Table 4.

TABLE 4

| CLASSIFICATION BY MAGNETIC SEPARATION (kg) | | |
|---|---|---|
| Crushing process | Primary | Secondary |
| Magnetic | 3.30 | 3.25 |
| Non-Magnetic | 0.01 | 0.01 |

The final classification obtained by the foregoing processes, including manual separation, is shown in the following Table 5.

TABLE 5

| | RECOVERY RESULT | | |
|---|---|---|---|
| Product | Weight (Kg) | Grade (%) | Recover rate (%) |
| Aluminum | 0.01 | 90 | 16 |
| Stainless | 2.80 | 95 | 85 |
| Non-separated products | 0.55 | | |

What is claimed is:

1. An environmentally acceptable method for disposing of a metallic gas generator from an unused air bag, comprising:
   a) heating the gas generator to actuate the gas generator to produce combustion gases and water soluble contaminants;
   b) washing the gas generator with a water composition to remove the contaminants therefrom to produce a contaminated water composition containing the contaminants;
   c) dividing the gas generator;
   d) chemically treating the contaminated water composition to produce a purified water composition; and
   e) classifying the divided gas generator parts into classified generator parts;
   whereby the classified generator parts and purified water can be disposed of in an environmentally acceptable manner.

2. An environmentally acceptable method for disposing of a metallic gas generator from an unused air bag, comprising:
   a) heating the gas generator to actuate the gas generator to produce combustion gases and an actuated generator having water soluble contaminants thereon;
   b) washing the actuated generator with a water composition to remove the contaminants from the actuated generator to produce a washed generator and a contaminated water composition containing the contaminants;
   c) dividing the washed generator to produce divided generator parts;
   d) chemically treating the contaminated water composition to produce a purified water composition; and
   e) classifying the divided generator parts into classified generator parts;
   whereby the classified generator parts and purified water can be disposed of in an environmentally acceptable manner.

3. An environmentally acceptable method for disposing of a metallic gas generator from an unused air bag, comprising:
   a) heating the gas generator to actuate the gas generator to produce combustion gases and an actuated generator having water soluble contaminants thereon;
   b) dividing the actuated generator to produce divided generator parts;
   c) washing the divided generator parts with a water composition to remove the contaminants from the divided generator parts to produce washed generator parts and a contaminated water composition containing the contaminants;
   d) chemically treating the contaminated water composition to produce a purified water composition; and
   e) classifying the washed generator parts into classified generator parts;
   whereby the classified generator parts and purified water can be disposed of in an environmentally acceptable manner.

4. An environmentally acceptable method for disposing of a metallic gas generator from an unused air bag, comprising:
   a) heating the gas generator to actuate the gas generator to produce combustion gases and an actuated generator having water soluble contaminants thereon;
   b) dividing the actuated generator to produce partially divided generator parts;
   c) washing the partially divided generator parts with a water composition to remove the contaminants from the partially divided generator parts to produce washed generator parts and a contaminated water composition containing the contaminants;
   d) further dividing the washed generator parts to produce divided generator parts;
   e) chemically treating the contaminated water composition to produce a purified water composition; and
   f) classifying the divided generator parts into classified generator parts;
   whereby the classified generator parts and purified water can be disposed of in an environmentally acceptable manner.

5. The method of claim 1, 2, 3 or 4, wherein the contaminants are alkaline contaminants.

6. The method of claim 1, 2, 3 or 4, wherein the contaminants are heavy metal contaminants.

7. The method of claim 1, 2, 3 or 4, further comprising melting the classified generator parts into ingots.

8. The method of claim 1, 2, 3 or 4, wherein the heating step is carried out in a furnace wherein the gas inflator is contacted with hot gases or a flame.

9. The method of claim 1, 2, 3 or 4, wherein the heating is between 150° C. to 450° C.

10. The method of claim 5, wherein the chemical treating step comprises neutralizing the contaminated water to a pH between about 6 and 8 with an acid.

11. The method of claim 10, wherein the acid is a mineral acid.

12. The method of claim 11, wherein the mineral acid is selected from the group consisting of sulfuric acid, hydrochloric acid or nitric acid.

13. The method of claim 12, wherein the mineral acid has a concentration of about 0.5 Normal or more.

14. The method of claim 1, 2, 3 or 4, wherein the step of classifying is selected from the group consisting of magnetic classification, gravitational classification, manual classification and combinations thereof.

* * * * *